Jan. 16, 1940. J. N. ICE 2,186,974
PIPE, TUBING, AND CONDUIT COUPLING
Filed June 10, 1938

Inventor
James N. Ice
By
Attorney

Patented Jan. 16, 1940

2,186,974

UNITED STATES PATENT OFFICE 2,186,974

PIPE, TUBING, AND CONDUIT COUPLING

James N. Ice, Wheeling, W. Va., assignor to a trusteeship of James N. Ice, Alexander Best, and Samuel K. Frank, all of Wheeling, W. Va., as trustees Application June 10, 1938, Serial No. 213,060

2 Claims. (Cl. 285—126)

This invention relates to a locking and sealing coupling for use in providing an all-metal seal and coupling for connecting the meeting ends of all types of tubular conduits without the necessity of providing any threads or connecting projections on the tubular conduits.

The primary object of the present invention is the provision of an all-metal coupling which, under pressure of the connecting elements, actuated by a thread, results in a distortion of the actual coupling and sealing elements to insure a locking cooperation to prevent relative endwise movement of the tubular elements and interpose between said elements and the actual coupling members a metallic wall serving as a seal.

A further object of the invention is the provision of a coupling of this type in the use of which the provision of threads on the pipe or tubing ends to be connected is entirely eliminated, and thus the weakening of such tubular elements necessarily incident to the formation of threads thereon is entirely avoided.

A further object of the invention is the provision of a coupling connector and seal of the type described which can be effectively applied on every known size in general use of tubular elements and is particularly effective in the joining of fragile steel conduit and copper tubing where, due to the nature of the conduit and tubing, the use of threads cut into these metal walls tends to very materially weaken and hence lead to breaking of the tubing or conduit in the threaded area.

The invention is particularly applicable to the joining of the meeting ends of the sections of copper tubing for water lines or the like which, under present methods, are connected only by a sweat joint which involves the putting together by the heat of the blow torch, soldering the joint, testing of pressure and leakage and continuing the operation if the joint does not measure up to the requirements, which is a slow and costly method of making the connection. With the present invention, the joint is easily and quickly made up with a tensile strength approximately as great as that of the material itself.

The complete elimination of the threaded ends of the pipe not only saves the time and expense of such thread formation but eliminates the not inconsiderable inconvenience of protecting the threads from damage during the handling and shipping of the pipe.

The invention is illustrated in the accompanying drawing, in which.

Figure 1:
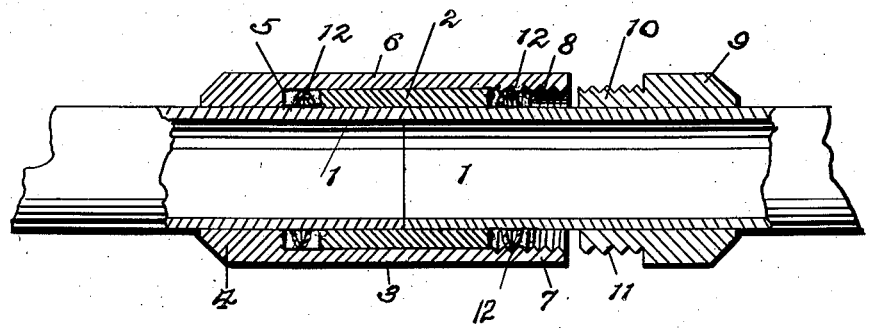
Figure 1 is a longitudinal sectional view showing the coupling parts applied to the conduit sections, with such coupling parts in normal or operative relation, ready for joining tubular parts.
Figure 2:
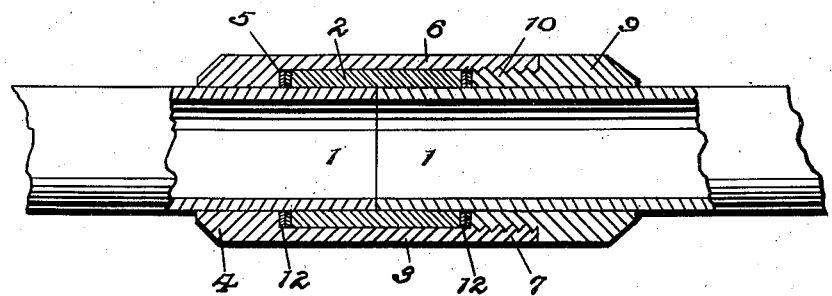
Figure 2 is a similar view of the coupling parts in operative relation.
Figure 3:
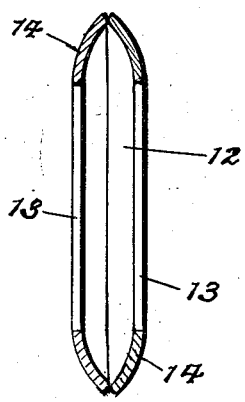
Figure 3 is an enlarged vertical sectional view through a pair of locking rings showing them in positions and relations occupied prior to the coupling operation.

The improved coupling is shown and will be generally described hereinafter as used in connection with a thin-walled tubular conduit, though it is to be understood in this connection that the illustration of such conduit is intended to indicate conduit sections, pipe sections and any and all tubular elements, the sections of which are to be connected in endwise relation to provide a pressure resisting, non-leaking connection. The tubular elements to be connected are illustrated at 1 in the accompanying drawing.

The coupling elements include a sleeve 2 designed for an accurate sliding fit with the meeting ends of the sections 1, the sleeve 2 having a length to extend in both directions beyond the joint. The coupling proper includes an elongated female member 3 formed at one end 4 for an accurate sliding interfit with one of the sections 1, with such interfitting portion terminating in an abrupt shoulder 5 which, when the parts are assembled, is disposed beyond one end of the sleeve 2. The coupling member 3 extends beyond the shoulder 5 as a cylindrical section 6 formed for accurate sliding interfit with the exterior of the sleeve 2 and of a length to extend beyond the opposite end of the sleeve as a projection 7, the inner surface of which is threaded at 8. The male member of the coupling proper comprises a cylindrical section 9 formed for accurate sliding interfit with the conduit section 1, the diameter of the portion next the coupling section 3 being reduced at 10 and exteriorly threaded at 11 to cooperate with the threads 8 to provide for a union of the coupling sections.

A pair of locking rings indicated generally at 12 is interposed between the shoulder 5 of the coupling section 3 and the proximate end of the sleeve 2. A similar pair of rings 12 are interposed between the projection 7 of the coupling section 3, the exterior of the conduit section 1 and the adjacent end of the sleeve 2.

Each ring 12 is of concavo-convex form generally considered, having a central opening 13 resigned to accurately fit the conduit sections 1 and an annular margin 14 which, in its curved or inclined form, is practically equal to the distance between the inner surface of the coupling section 3 and the exterior surface of the conduit section 1. The annular margin 14 of the rings is shown as slightly curved or concavo-convex though they may with equal efficiency be inclined.

Obviously, with the parts arranged as shown in Figure 1, the coupling is effected by threading the coupling section 9 into the coupling section 3. As the locking rings are arranged with their concaved faces next to each other, this cooperation of the coupling sections exerts pressure upon all rings, one pair being pressed between the end of the sleeve 2 and the shoulder 5 and the other pair being pressed between the end of the sleeve 2 and the reduced end of the section 9 of the coupling. Under this pressure, the locking rings are forced or distorted from their normal form to and approaching a straight form. As the locking rings are preferably of steel with some inherent resiliency and with their outer edges and inner edges relatively thin or sharp, this distortion of the rings under the cooperation of the coupling sections forces the outer edges into the coupling section 3 and their inner edges into the wall of the conduit sections. This operation absolutely locks the respective sections 1 of the conduit against relative endwise movement and at the same time, as the locking rings under the pressure are moved into a more or less flat condition, there is interposed between the coupling sections and the wall of the conduit sections a relatively flat, imperforate partition of double thickness, the edges of which are seated more or less in the material of the coupling sections and the wall of the conduit, thus affording a perfect seal against any admission from the exterior of the conduit particularly of liquids or moisture.

Attention is particularly called to the ease of assembly of the parts of the coupling. The section 3 is passed over one conduit end, a pair of locking rings is applied over the same conduit end, the sleeve 2 is applied over such conduit end, the other conduit end is inserted in the sleeve after a pair of locking rings and the coupling ring 9 have been applied to such end. The sole detail requiring attention is the fact that each pair of locking rings must be arranged with a concaved side toward each other. Following this disposition, the sole requirement is the connection of the coupling sections 3 and 9, each of which sections are appropriately formed of course for the reception of a wrench or other tool to permit sufficient pressure to distort the rings as referred to.

Attention is particularly called to the fact that the coupling is an all-metal coupling. There are no fabric parts or other conventional compressible sealing elements usually employed in sealing couplings, and when the connection has been made, it will remain effective against deterioration or leakage as long as the coupling is not disconnected. Even if the coupling section 9 should become slightly loosened, the locking rings will still maintain an effective locking and sealing relation because in their distorted position resulting from the coupling pressure, the edges of the rings will have engaged into the material of the conduit section and coupling section and cannot be displaced.

It will, of course, be understood that while the illustration and description of the invention is directed particularly to tubular electrical conduits, the invention in its effective sealing and locking functions is equally applicable to the securing of the meeting ends of pipe sections, particularly when the locking and sealing functions are of importance in that use.

What is claimed to be new is:

1. A combined sealing and locking coupling for connecting the meeting ends of tubular conduits, comprising a sleeve slidably embracing and overlying the joint of the meeting ends of the conduits coupling members designed for threaded connection, and locking pairs of rings of concavo-convex section arranged in contact with their concaved faces adjacent, said locking rings normally equalling the transverse dimension of the space between the coupling members and the conduit sections, the coupling movement between the coupling members serving to flatten the rings between the sleeve and coupling members to force the edges of the rings into biting contact into the material of the coupling members and the conduit sections.

2. A construction as defined in claim 1, wherein the locking rings will in final position present a double thickness of imperforate metal forming a complete seal between the coupling members and the conduit sections.

JAMES N. ICE.